May 28, 1968     R. B. HENDERSON     3,385,985
AIR BEARING BLOWER

Filed Oct. 18, 1965                               3 Sheets-Sheet 1

INVENTOR
RICHARD B. HENDERSON
BY
ATTORNEY

May 28, 1968  R. B. HENDERSON  3,385,985
AIR BEARING BLOWER

Filed Oct. 18, 1965  3 Sheets-Sheet 2

INVENTOR
RICHARD B. HENDERSON
BY
ATTORNEY

May 28, 1968  R. B. HENDERSON  3,385,985
AIR BEARING BLOWER
Filed Oct. 18, 1965  3 Sheets-Sheet 3
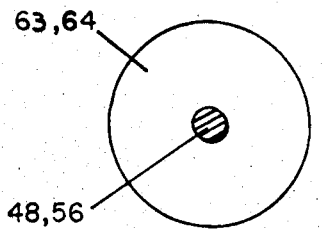
Fig. 5
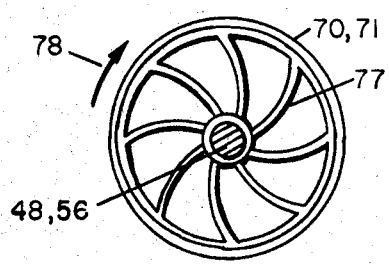
Fig. 6
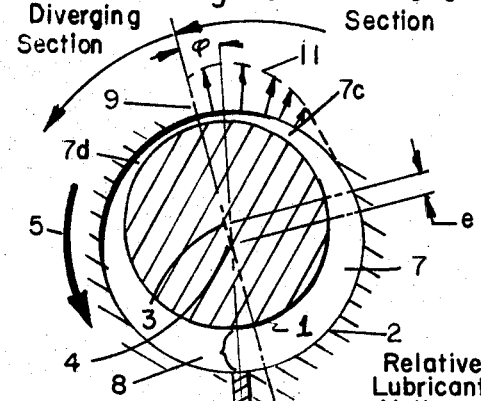
Fig. 9
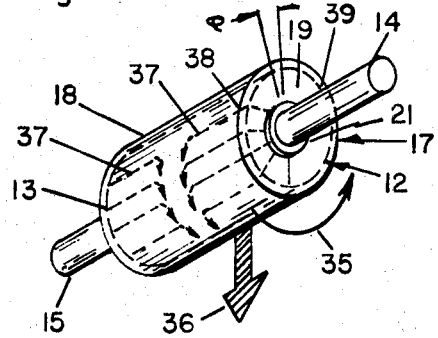
Fig. 13
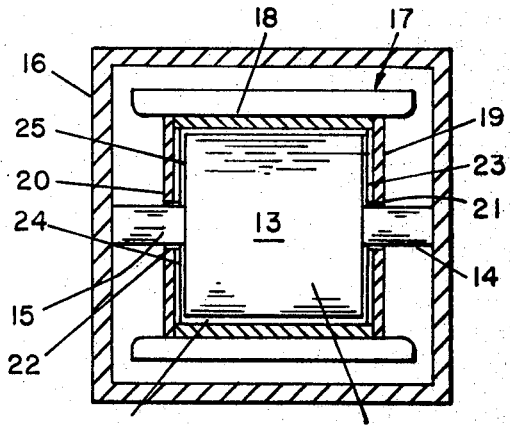
Fig. 8
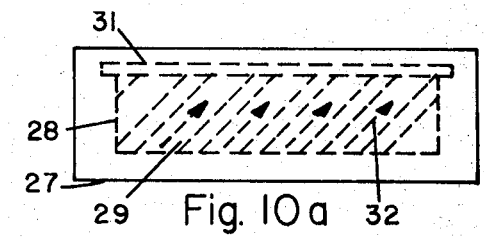
Fig. 10a
Fig. 10b
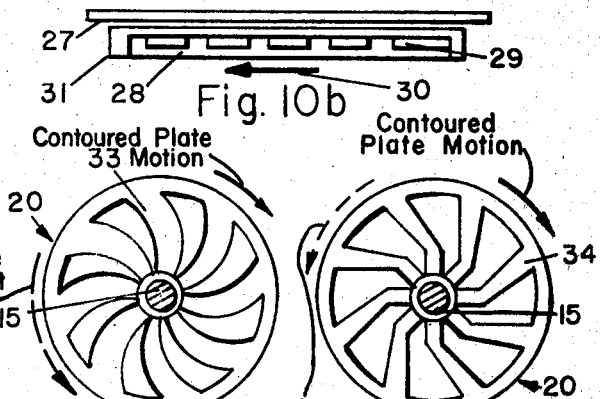
Fig. 11  Fig. 12
INVENTOR
RICHARD B. HENDERSON
BY
ATTORNEY United States Patent Office 3,385,985
Patented May 28, 1968

3,385,985
AIR BEARING BLOWER
Richard B. Henderson, Nashua, N.H., assignor to Sanders Associates, Inc., Nashua, N.H., a corporation of Delaware
Filed Oct. 18, 1965, Ser. No. 497,013
14 Claims. (Cl. 310—90)

ABSTRACT OF THE DISCLOSURE

This invention relates generally to hydrodynamically lubricated bearings, and more particularly to an air bearing wherein both radial and thrust loads are supported by a continuous film of air so as to facilitate high speed operation of a small compact blower.

---

This invention relates generally to hydrodynamically lubricated bearings, and more particularly, to an air bearing wherein both radial and thrust loads are supported by a continuous film of air so as to facilitate high-speed operation of a small compact blower.

Heretofore, hydrodynamic bearings of two general types have been employed; one includes a journal for supporting radial loads, and the other includes flat plates for supporting thrust loads. The journal bearing includes two substantially concentric cylindrical surfaces between which is a thin film of fluid such as air. One of these surfaces is stationary about its axis while the other rotates about its axis. The stationary surface is generally referred to as the stator, and the rotating surface is referred to as the rotor. In operation, the axes are slightly eccentric due to a load applied to the rotor, and so the two surfaces define converging and diverging wedges through which the fluid lubricant is pumped by the rotary action of the rotor.

Flow into the converging wedge is invariably laminar, and the fluid pressure builds up in the wedge. The maximum pressure point in the wedge is between the point of closest separation between the surfaces and the point of greatest separation between the surfaces, sometimes referred to as outlet and inlet clearances, respectively. As the ratio of inlet to outlet clearance increases, the maximum pressure point moves closer to the outlet clearance or the point of minimum clearance between the surfaces. It is generally preferred that the maximum pressure point be directly opposed to the load on the rotor.

The pressure in the diverging wedge is substantially lower than the pressure in the convering wedge. If the bearing lubricant is a liquid such as oil, care must be taken to be sure that the bearing cavity is filled in the diverging portion so that the film of lubricant is continuous. Any break in the film of lubricant causes excessive wear and invariably damages the bearing. This problem is avoided when the lubricant is a gas such as air.

One disadvantage of hydrodynamically lubricated journal bearings lies in their tendency to exhibit instability under light load conditions. This is manifested in the tendency of the rotor axis to rotate in an orbit rather than remaining fixed relative to the stator axis. If the amplitude of this orbital motion becomes large enough, the rotor and stator will touch, resulting in damage and sometimes destruction of the bearing. When the orbital frequency, which is called whirl frequency, is equal to one-half the frequency of rotation of the rotor about its own axis, the load carrying capacity of the lubricating fluid is essentially zero and so the rotor and stator touch.

Hydrodynamically lubricated thrust bearing of a variety of types are employed. These include the tilting shoe, tapered land and such special types as the step, spiral groove and the herringbone configuration of one of the plates of the thrust bearing. In the self-acting gas lubricated thrust bearing, two opposing surfaces are provided disposed transverse to the axis of the bearing. One surface is stationary as the stator and the other moves as the rotor, and one surface is etched or contoured so that pressure pockets build up between the surfaces to resist thrust loads.

It is an object of the present invention to provide a self-acting or hydrodynamically lubricated bearing incorporating features of both the hydrodynamically lubricated journal and thrust bearings in a single unitary device.

It is another object of the present invention to provide a small compact air blower, the bearings of which are lubricated by air.

It is another object of the present invention to provide a small compact air blower, the bearing of which are hydrodynamically lubricated by air to accommodate both radial and thrust loads.

It is a further object to provide such an air blower incorporating features whereby the phenomenon known as half-frequency or half-speed whirl is substantially avoided.

In accordance with principal features of the present invention, a self-acting hydrodynamically lubricated bearing is provided including a rotor member and a stator member. The rotor member and stator members include surfaces which combine to define a journal bearing for carrying radial loads and flat bearings for carrying thrust loads in such a manner that there is a continuous flow of lubricating fluid between the journal bearing and the thrust bearings. In a preferred embodiment, the rotor substantially encapsulates the stator enclosing the lubricating fluid therebetween. In this embodiment, the stator is equipped with electromagnets which are energized to produce a rotating magnetic field about the stator which acts upon magnetically permeable material carried by the rotor causing the rotor to rotate relative to the stator. Electrical power for energizing the magnets is provided via electrical leads which extend through an opening at one end of the rotor which is substantially concentric with the axis of the rotor. This opening and a similar opening at the other end of the rotor define annular openings between the rotor and stator through which the lubricant such as air flows into the bearing spaces.

The present invention contemplates the use of any of the above-mentioned known types of plate contours of the thrust bearings whereby pressure pockets of lubricant are formed between the thrust bearing plates to resist thrust loads. However, preferred embodiments of the invention include a spiral groove configuration; that is, one of the thrust bearing plates, preferably the plate carried by the rotor, is equipped with grooves which spiral out from the axis of the rotor and in which pressure pockets are formed which resist thrust loads. The spiral groove configuration is preferred because under operating conditions a pressure gradient is built up along each groove in the direction of increasing radius and this pressure gradient combines with pressure gradients in the journal bearing divergent and convergent portions to provide a highly effective flow of the lubricating fluid.

The above and other features of the present invention are combined in a specific embodiment to provide an air blower in which the rotor carries impellers and is enclosed along with the impellers in a plenum chamber equipped with a passageway conducting air from the chamber. Circular apertures are formed in opposite walls of the plenum chamber housing for access to the chamber, and perforated circular disks are secured in the apertures to form walls for the chamber. Eccentrically disposed mounting holes in the disks accommodate a fixed shaft attached to the stator, thereby enabling accurate alignment of the stator along a given axis by simply rotating the circular disks. A similar structure for aligning a stator structure is described in U.S. Patent 2,772,046 which issued Nov. 27, 1965, to G. J. Shomphe. Electrical conductors extends along the shaft and connect to field windings carried within the stator so that in operation the field windings produce a rotating magnetic field which operates magnetically permeable parts of the rotor causing the rotor to rotate and the impellers to force a flow of air through the plenum chamber and passageway.

Other features and objects of the present invention will be apparent from the following specific description taken in conjunction with the figures in which:

FIGURE 5 is a sectional view taken on the line 5—5 of FIGURE 3 illustrating the smooth stator plate of one of the thrust bearings;

FIGURE 6 is a sectional view taken on the line 6—6 of FIGURE 3 illustrating the spiral grooved rotor plate of one of the thrust bearings;

FIGURE 8 is a simplified sectional view of a device such as the electric blower to illustrate features of the hydrodynamically lubricated journal and thrust bearings thereof;

FIGURE 9 illustrates the forces acting on a hydrodynamically lubricated journal bearing;

FIGURES 10a and 10b illustrate a structure to aid in understanding the functioning of an obliquely grooved dynamically lubricated thrust bearing;

FIGURES 11 and 12 illustrate two suitable types of obliquely grooved thrust bearing plates; and FIGURE 13 is a three-quarter view of a rotor and stator of the device in FIGURE 3 to illustrate the flow pattern of lubricating fluid to the bearing.

Figure 1:
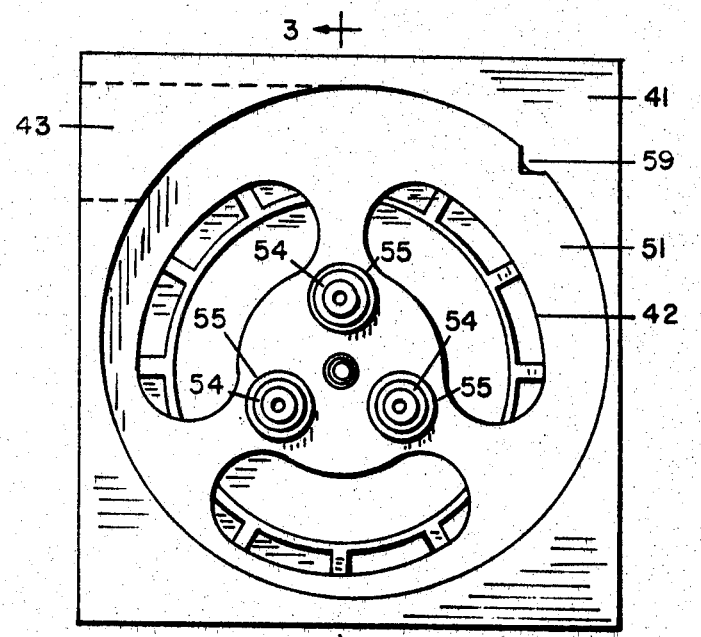
FIGURE 1 is an end view of the electric blower showing the electrical terminals and air inlet openings.
Figure 2:
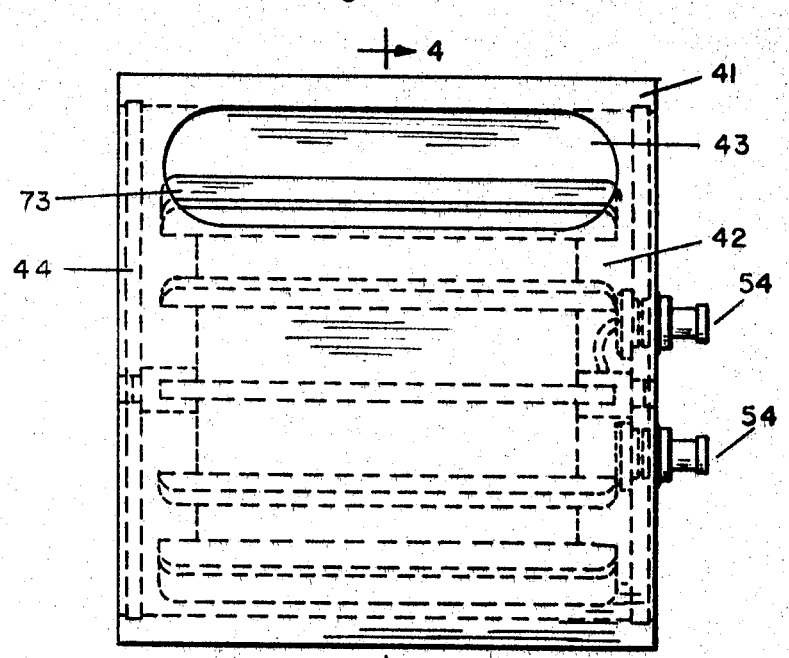
FIGURE 2 is a side view of the electric blower showing the air outlet.

Turning first to FIGURES 8 to 13, there are illustrated simple structures and diagrams whereby to understand the principal features of the hydrodynamically lubricated bearing which combines the functions of both the journal bearing and the thrust bearing. FIGURE 9 illustrates in diagram form, a hydrodynamically lubricated journal bearing. The journal bearing is defined by two cylindrical surfaces 1 and 2 having axes 3 and 4, respectively. For purposes of illustration, it will be assumed that the outer surface 2 is the rotor surface and is caused to rotate by forces applied thereto. Accordingly, the inner surface 1 is the stator surface and is fixed in space relative to the rotor surface. For purposes of illustration, the stator surface is shown as a cylinder of substantially smaller diameter than the rotor surface cylinder to better illustrate the parameters involved. In operation, when the rotor surface is rotated about its axis in the direction of the arrow 5, and a load is imposed on the rotor surface as represented by arrow 6, a continuous film of fluid lubricant will separate the two surfaces throughout the clearance space 7, and the load will cause the axes of the rotor and stator surfaces to be eccentric with respect to each other forming the maximum and minimum clearances 8 and 9. These are sometimes referred to as inlet and outlet clearances, respectively. Proper lubrication can be obtained only when the surfaces do not touch and when the film of lubricating fluid throughout the clearance space 7 is continuous.

In operation, the rotary action of the rotor drags the lubricant around in the clearance space between the surfaces 1 and 2 in the direction of arrow 5 and so the lubricant is forced through the narrow outlet clearance 9. This action causes a build-up of pressure of the lubricating fluid in the converging wedge portion 7c of the clearance space between the surfaces 1 and 2, and at the same time a substantially lower pressure is produced in the diverging wedge portion 7d of the clearance space between the surfaces. In some respects, the rotary action operates upon the fluid in the converging wedge portion of the clearance space as a viscous pump building up pressure toward the outlet clearance 9 of this section. Also, the action of the rotor upon the fluid in the diverging wedge portion produces a diffusive flow of the fluid therethrough, accompanied by substantially lower pressures. Thus, the pressure of the fluid which operates upon the surfaces 1 and 2 on opposite sides of the line 10 through the arc centers 3 and 4 of the two surfaces is substantially different on each side of the outlet clearance 9, being considerably lower in the divering wedge portion 7d than in the converging wedge portion 7c. If the ends of such a journal bearing are open, there will be a tendency for the fluid to flow out of the ends from the converging wedge portion and to flow into the diverging wedge portion from the ends of the bearing.

The broken line contour 11 in FIGURE 9 represents the magnitude of the pressure acting against the rotor surface 2 along the converging wedge portion 7c. In operation, it is preferred that the load imposed upon the rotor represented by arrow 6 be directly opposed to the maximum pressure point as illustrated in the figure. Since the maximum pressure point always lies closer to the outlet clearance 9 than to the inlet clearance 8 along the converging wedge portion 7c between the surfaces, the angle $\phi$ will always be less than 90 degrees. It can be shown that the angle $\phi$ is a function of the eccentricity ratio $\epsilon$ which is the ratio of eccentricity $e$ to the clearance $c$ (denoted by the referenced numeral 7 in FIGURE 9) between the two surfaces 1 and 2 (when their centers are not eccentric). This relationship is given by the equation:

$$\tan \phi = \frac{\pi}{4} \frac{(1-\epsilon^2)^{1/2}}{\epsilon}$$

It can be shown that the total outward volume flow of lubricating fluid Q from the converging wedge portion of the space between the surfaces 1 and 2 is approximated by the following relationship: $Q = \pi D L c N \epsilon$. In the above equation, D is the mean diameter of the rotor and stator surfaces, L length of the bearing and N is the bearing speed.

The present invention takes advantage of the above-described tendency of lubricating fluid flow out of the ends of the journal bearing from the converging wedge portion of the space between the bearing surfaces and the tendency of lubricating fluid to flow into the diverging wedge portion from the ends of the bearing. The adequacy of these flows of lubricating fluid into and out of the journal bearing is insured when the ends of the journal bearing are supplied with lubricating fluid at a pressure greater than the prevailing ambient pressure. This, of course, is no problem if the lubricating fluid is fed into the system under pressure as in a hydrostatically lubricated journal bearing. However, the problem is somewhat more difficult when hydrodynamic lubrication only is intended. The present invention contemplates structure for solving this problem and at the same time providing thrust bearings at each end of the journal bearing which function in the manner of thrust bearings to absorb thrust loads along the axis of the rotor.

FIGURE 8 is a sectional view showing a hydrodynamically lubricated journal bearing equipped with hydrodynamically lubricated thrust bearings at each end. The stator 12 includes a cylindrical body 13 fixedly mounted by shafts 14 and 15 to a housing 16. The rotor 17 which encloses the stator 13 includes a sleeve 18 and contoured thrust bearing plates 19 and 20 which have concentric openings 21 and 22 for clearing the shafts 14 and 15. The contoured faces 23 and 24 of the plates 19 and 20, respectively, cooperate with the smooth faced ends of the cylinder 13 to form thrust bearings at each end of the cylinder. The dimensions of the various parts are such that suitable clearances are produced between all surfaces of the stator 12 and the rotor 17.

The contoured surfaces 23 and 24 of the thrust bearing plates 19 and 20 are preferably designed so as to produce in the thrust bearing clearance space such as 25, between these surfaces and the cylinder 13, pressure pockets of lubricant disposed toward the periphery of the plates adjacent the journal clearance space 26 between the cylinder 13 and sleeve 18. The formation of these pressure pockets of lubricant, as mentioned above, insures a proper flow of the lubricant into the journal space.

Various thrust bearing plate contours commonly employed in the art would be suitable for producing the pressure pockets adjacent the journal bearing space 26 and some of these types of contours have already been mentioned. However, the preferred technique is to employ spiral grooves which are etched or machined into the thrust bearing surface of the plates 19 and 20 because the spiral grooves not only produce the pressure pockets toward the periphery of the plate, but also insure a continual flow of lubricating fluid into the pressure pockets. This is illustrated diagrammatically in FIGURES 10a and 10b, which show two plates, a smooth stator plate 27 and a contoured rotor plate 28 face to face in close proximity. The contoured plate is equipped with a row of oblique grooves such as 29. These grooves are oblique to the direction of motion 30 of the contoured plate relative to the stationary smooth plate. In operation, if the flow along these grooves is retarded, by, for example, a pressure block 31, fluid pressure will build up in each of the grooves and, depending upon the amount of fluid leakage past this pressure block, there will be a flow 32 of pressurized lubricating fluid along each of the grooves, with pressure being the greatest at the ends of the groove adjacent the flow block 31. In other words, the lubricant will be dragged along the grooves by viscous adherence to the smooth stationary plate 27 and by virtue of the grooves will acquire a motion transverse to the direction of motion 30 of the contoured plate 28.

This same action occurs with the spiral grooved thrust plate illustrated in FIGURE 11 which is attached to the rotor and rotates about an axis through its center. Since the grooves 33 are spiral in shape, they are at all points along each groove directed oblique to the tangential direction of relative motion between the contoured plate and a smooth thrust plate adjacent thereto. In order to build up pressure pockets toward the outer periphery of such a contoured thrust bearing pressure plate, the groove must spiral outward in the same rotational direction that the lubricating fluid moves relative to the contoured plate. Thus, such a thrust bearing functions to produce the pressure pockets at its periphery only when rotated in one direction: rotation in the opposite direction will not produce these thrust pressure pockets.

Generally, when the lubricant is a gas, the centrifugal force imposed upon the gas by the rotational motion is insignificant and will itself not produce the desired pressure pockets toward the periphery of the contoured plate. For this reason, the pressure pockets are produced substantially only by the phenomenon illustrated in FIGURES 10a and 10b and so the grooves must spiral and the direction of the spiral must be related to the direction of rotation of the bearing as described. Straight grooves or rotation of a spiral groove thrust bearing in the wrong direction will not produce the desired pressure pockets of gas lubricant. On the other hand, other types of grooves which resemble a spiral groove could be employed rather than the smoothly spiraling grooves shown in FIGURE 11 to accomplish the same effect. For example, the grooves could have a herringbone appearance as grooves 34 shown in FIGURE 12.

Figure 3:
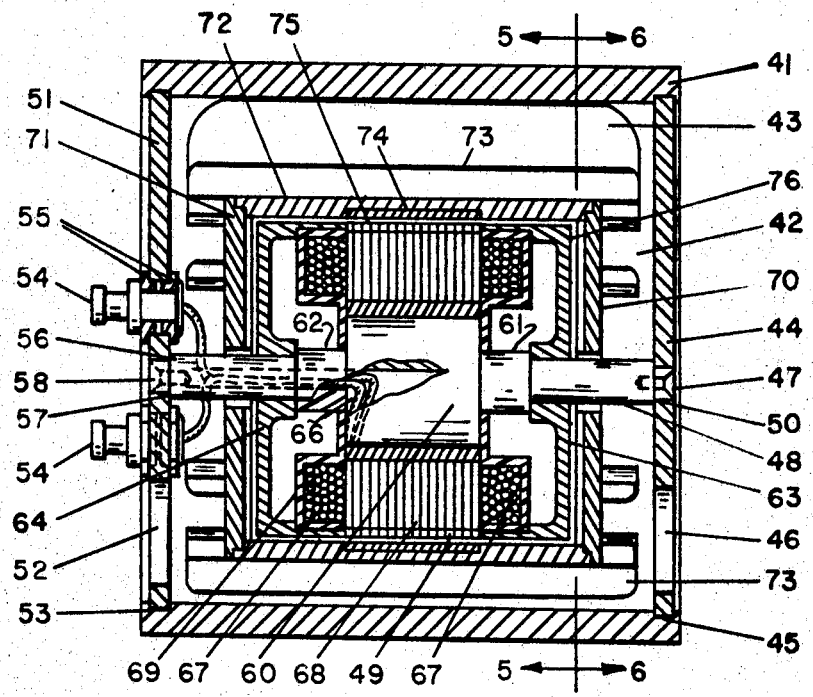
FIGURE 3 is a sectional view taken on the line 3—3 of FIGURE 1.
Figure 4:
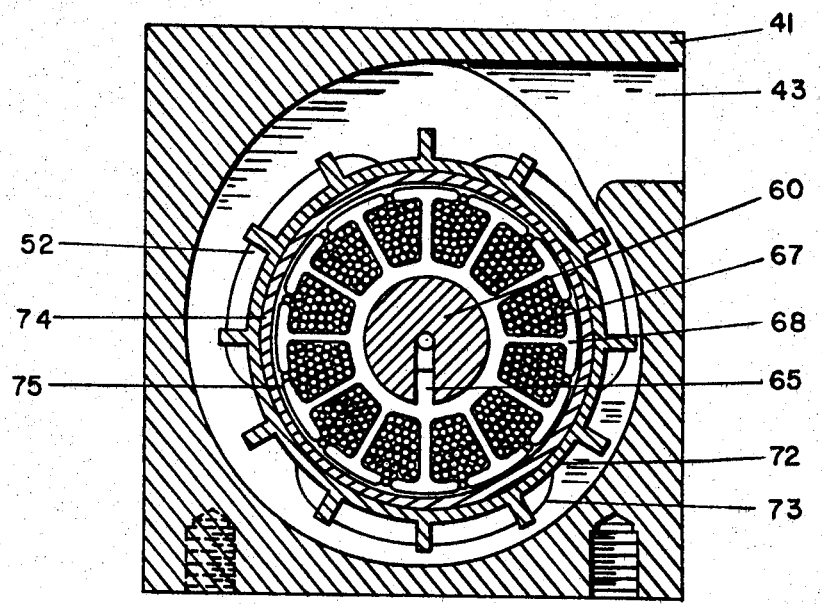
FIGURE 4 is a sectional view taken on the line 4—4 of FIGURE 2.

FIGURE 13 is a giagram intended to illustrate the dynamic action of flow of the fluid lubricant in the unitary journal-thrust bearing of FIGURE 3. As shown, the rotor including sleeve 18 and contoured thrust plates 19 and 20 which encloses the cylinder 13 of the stator is caused by any suitable force to rotate in the direction of the arrow 35 and the load represented by the arrow 36 is imposed on the entire rotor structure. As a result there is defined in the clearance space between the rotor and stator a continuous passage through which the lubricating fluid flows. The course of flow of this lubricating fluid is suggested by the broken lines 37. The fluid enters through the annular opening between the shafts 14 and 15 and the holes 21 and 22 at the center of the bearing plates 19 and 20 and is caused to flow to pressure pockets at the periphery of the plates as already described above. From these pressure pockets, the lubricating fluid is most inclined to flow into the diverging wedge portion 38 of the journal bearing clearance space 26 because the pressure, as already mentioned, in this portion of the clearance space of the journal bearing is lowest. Conversely the fluid is less inclined to flow into the converging portion 39 of the journal bearing clearance space. In other words, the gas is sucked in from the ends of the bearing through the annular opening and forced into pressure pockets along the inside periphery of the contoured thrust plates and from there the greatest flow is into the divergent wedge portion, the lubricant flows by virtue of the rotary action of the journal bearing into the converging wedge portion where it is compressed as already described. Flow out from the converging region includes flow into the diverging region, leakage from the ends of the bearing and leakage through the stator and rotor structures into the surrounding housing 16.

The load carrying capacity of such a bearing is a function of fluid compressibility ratio and viscosity, bearing length, diameter and eccentricity ratio and speed of operation, all of which can be determined by the solution of bearing equations, some of which relate to the journal bearing and are described and discussed in "Advanced Bearing Technology" by Bisson and Anderson, published by the Office of Scientific and Technical Information, NASA, 1964. One suitable set of dimensions of such a bearing is the following:

| | |
|---|---|
| Diameter | .75 inches. |
| Length | .75 inches. |
| Radial clearance $c$ | 300 micro-inches. |
| Ambient pressure | 15 p.s.i. |
| Gas viscosity | $3 \times 10^{-9}$ lbs. sec./ inches square. |
| Operating speed | 24,000 r.p.m. |
| Load | about 20 lbs. |

The principal features of the bearing described above with relation to FIGURES 8 to 13 have been somewhat limited to the hydrodynamically lubricated bearing (sometimes called the self-acting or dynamic bearing). However, these features could be combined with hydrostatic lubrication techniques so that the total lubrication is accomplished in part hydrodynamically and in part hydrostatically. If hydrostatic lubrication is also employed, the so-called dry start is avoided. At the commencement of a dry start, the journal bearing, and, perhaps, the thrust bearing surfaces are touching, and this introduces problems. The use of hydrostatic lubrication would avoid this. Obviously, application of the hydrodynamic lubricating features of the invention in combination with hydrostatic lubrication requires careful consideration of the many parameters involved as well as materials, environmental conditions, length of duty cycle and the frequency of starting and stopping. Another alternative to eliminate the effects of dry start is to make clearances 21 smaller than clearances 26, thus a dry start would not be as detrimental both electrically and mechanically. Contact of thrust surfaces can be avoided here also with a small shoulder on the shaft to keep the thrust plates from touching.

Vibration and shock of gas bearing such as shown herein can lead to the destruction of the bearing, particularly when the excitation frequency of the shock corresponds to one-half the rotational speed. This is because journal type gas lubricated bearings are very susceptible to half-frequency whirl which occurs at a critical speed and causes the rotating member to whirl or orbit about an eccentric point at a frequency which is half the rotational frequency of the rotating member. In accordance with another feature of the present invention, the tendency of occurrence of half-frequency whirl phenomenon and the ensuing destruction is avoided by making the stator as large in diameter and as long as possible and in addition by making the eccentricity ratio $\epsilon$ as large as possible. In accordance with this feature, the eccentricity ratio is made as large as possible by loading the rotor. This is accomplished by the simple expedient of making the rotor relatively heavy. For example, a specific embodiment of the invention illustrated in detail in FIGURES 1 to 7 includes a stator and rotor, including impellers carried on the outside of the rotor weighing about 10 grams. This relatively large weight of the rotor permits shock loads in excess of 500 G's to be experienced without degradation in performance.

A miniature air blower, which need be no larger than a cubic inch in size, incorporating features of the hydrodynamically lubricated journal and thrust bearings described above is illustrated in FIGURES 1 to 7. The blower assembly, as shown in FIGURES 1 to 4, consists of a casing or housing 41 which may be formed from a block of metal or plastic. The block has a plenum chamber 42 extending therethrough which is generally involute in shape with a tangential outlet 43 through one face of the block for conducting air from the chamber to the outside of the housing. The block may have the involute chamber and tangential outlet machined therein or it may be molded or formed by die-casting. While the housing is shown as a block in the drawings, it is to be understood that the casing may be of any external shape or form. An important feature is that it provides an involute shaped chamber in which the rotor and motor elements are mounted.

End cap 44 is in the form of a perforated, circular disk and is traversely mounted in a circular recess 45 in the end of the housing, which end forms an end wall for chamber 42. One or more perforations or apertures 46 are formed in end cap 44 for air inlets. A shaft-mounting hole 47 is formed in end cap 44 in which shaft portion 48 of the motor stator, generally indicated as 49, is secured. It will be noted that hole 47 is eccentrically disposed as related to the circular disk shape of end cap 44 to locate the blower properly in the involute chamber 42. Hole 47 may be broached to receive the end portion of shaft 48 which may be formed with shoulders 50 by a milling cut on each side of the shaft portion 48 so that the shaft will be prevented from rotating with respect to end cap 44.

End cap 51 is similar to end cap 44 and has apertures 52 formed therein for air inlets. It is mounted in a circular recess 53 formed in housing 41. Terminal lugs 54 are supported in cap 51 by insulating bushings 55. Shaft portion 56, having the end formed with shoulder 57, is mounted in hole 58. The shaft-mounting holes 47 and 58 define the axis of rotation of the blower. Eccentrically disposing the holes 47 and 58 relative to the circular disks or end caps 44 and 51 enables accurate alignment of the shaft 48 along a given axis by rotating the circular disks.

Both end caps 44 and 51 have a notch 59 or other indicia on the periphery to orient the end caps with respect to the housing during assembly to locate the stator 49 in chamber 42. End caps 44 and 51 are secured in recesses 45 and 53 by staking or any other suitable expedient to secure them firmly in place.

Figure 7:
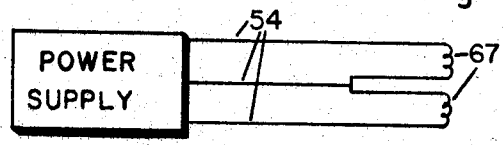
FIGURE 7 is a circuit diagram showing connections to an electrical power source.

Stator 49 is mounted on a cylindrical member 60 which is supported between end caps 44 and 51 by shaft portions 48 and 56. Enlarged shaft portions 61 and 62 afford shoulders against which the stator thrust bearing plates 63 and 64 abut. Cylindrical member 60 and portions 48, 56, 61 and 62 may be formed as an integral member. A slot is cut as shown at 65 in cylindrical member 60 and adjacent enlarged shaft portions 61 and 62 which intercepts a hole drilled through shaft portions 56 and 62 to afford passage for wires 66 from terminal lugs 54 to polyphase windings 67 on stator 49. Slotted core 68 is of laminated construction and is assembled on cylindrical member 60. Windings 67 are placed in slotted core 68 in a conventional manner for polyphase windings so that when the three terminals 54 are connected to a suitable polyphase power supply as shown in FIGURE 7, a rotating field around core 68 will be produced. Windings 67 are sealed by insulating material 69 which is molded or otherwise secured over the ends of the windings on stator 49.

The core 68 and windings 67 are sandwiched between the stator thrust bearing plates 63 and 64 which are fixed to shaft portions 48 and 56, respectively. These plates include annular recesses into which the molded insulation 69 fits snugly as shown and the plates combine with the ends of the slotted core to define the stator cylinder 49.

The blower rotor or centrifugal fan includes rotor thrust bearing plates 70 and 71 rigidly attached to rotor sleeve 72 defining a substantially closed cylinder encapsulating the stator cylinder 49. Radial fins 73 extend axially of sleeve 72 and may be formed integrally therewith. It will be noted that the ends of fins 73 extend beyond sleeve 72 into the spaces between plates 70 and 71 and end caps 44 and 51 of the housing to form therewith radial passages through which air is caused to flow by centrifugal force from inlet openings 46 and 52 into chamber 42 and out passage 43. Hysteresis ring 74 is secured to sleeve 72 and rotates therewith. Ring 74 is spaced from core 68 and stator thrust plates 63 and 64 to form the journal clearance space 75 and by an amount suitable to cause magnetic polarization to be induced therein which, with the rotating field from the stator, will effect rotation of the ring. Inasmuch as ring 74 is secured to and carried by sleeve 72, rotation of the centrifugal fan results.

It is to be understood that any suitable materials may be used in the construction of this blower. For ease of manufacture, it has been found that the housing 41 and end caps 44 and 51 can be made from aluminum. The shaft assembly comprising portions 48, 56, 61 and 62 may be made of non-magnetic, stainless steel. Ring 74 is of chrome steel. Laminated core 68 will be of transformer steel. The centrifugal fan assembly in the preferred embodiment will be made of aluminum.

FIGURE 5 illustrates the smooth surface of one of the stator thrust bearing plates 63 or 64 and FIGURE 6 illustrates the contoured surface of one of the rotor thrust bearing plates 70 or 71 which faces the smooth surface of the stator thrust bearing plate. The opening at the center of plate 63 accommodates a rigid fit of the shaft 48 while the opening at the center of thrust plate 70 provides substantial clearance of the shaft 48 to permit the influx of lubricating air into the thrust bearing clearance space 76 between the two plates. The contour of the rotor thrust bearing plate includes spiral grooves 77 such as shown. As already mentioned, the angular direction of outward spiral of these grooves must be the same as the relative direction of flow of lubricant past the grooves. Since the grooves are carried by the rotor thrust bearing plate, the direction of rotation of this plate is as indicated by the arrow 78.

As already mentioned, the spiral type contour of the thrust bearing plate is only one of several that could be employed to achieve various lubricant flow features of the present invention. For example, the herringbone type contour shown in FIGURE 12 could be substituted.

While there has been shown and described a particular embodiment of the present invention, it will be apparent to those skilled in the art that various changes and modifications may be made without departing from the spirit of the invention, and it is therefore intended in the appended claims to cover all such changes and modifications as fall fairly within the spirit and scope of this invention.

What is claimed is:
1. A hydrodynamically lubricated bearing comprising,
a stator member defining a journal bearing surface and at least one thrust bearing surface,
a rotor member defining a journal bearing surface and at least one thrust bearing surface,
said journal bearing surfaces being disposed one within the other defining therebetween a journal bearing clearance space,
said thrust bearing surfaces being disposed in opposing relationship defining therebetween a thrust bearing clearance space, and
said journal and thrust bearing spaces being contiguous,
said contiguous journal bearing and thrust bearing spaces having a uniform gap,
a lubricating fluid distributed throughout said journal and thrust bearing spaces, and
means for causing said rotor member to rotate relative to said stator member,
whereby said lubricant flow through and between said journal and thrust bearing clearance spaces to lubricate said bearing, and
said lubricating fluid entering said bearing substantially perpendicular to the thrust bearing clearance space.
2. A bearing as in claim 1 and further including,
means integral with at least one of said thrust bearing surfaces for compelling said fluid to flow through said thrust bearing clearance space into said journal bearing clearance space.
3. A bearing as in claim 1 and further including,
channels along at least one of said thrust bearing surfaces directed oblique to the direction of relative motion of the opposing thrust bearing surface, and
means for directing said fluid from an external source into said thrust bearing clearance space,
whereby said rotation compels said fluid to flow along said channels into said journal bearing clearance space.
4. A baring as in claim 1 and in which,
said thrust bearing surfaces are disk-shaped and on axes concentric with their associated journal bearing surfaces, and
at least one of said thrust bearing surfaces includes spiral grooves extending between the middle and the periphery thereof.
5. A bearing as in claim 3 and in which,
said fluid is a gas which is compressed as said gas flows along said channels,
thereby to insure flow of said gas into said journal bearing clearance space.
6. A bearing as in claim 1 in which,
said stator member is disposed within said rotor member.
7. A hydrodynamically lubricated motor comprising,
a stator member,
means for supporting said stator member in a substantially fixed position,
means within said stator member for producing a rotating magnetic field about said stator member,
a rotor member enclosing said stator member and defining contiguous journal and thrust bearing clearance therebetween,
said contiguous journal bearing and thrust bearing spaces having a uniform gap,
a lubricating fluid distributed throughout said spaces,
means attached to said rotor member for intercepting said magnetic field, thereby to impart a rotation producing torque to said rotor member, and
means contiguous with said thrust bearing clearance space for compelling said fluid to flow through said thrust bearing clearance space into said journal bearing space when said rotor member rotates, and
said lubricating fluid entering said bearing substantially perpendicular to the thrust bearing clearance space.
8. A motor as in claim 7 and in which,
said contiguous means includes channels along said thrust bearing space directed oblique to the direction of relative motion of said fluid immediately adjacent thereto,
whereby said flow through said thrust bearing clearance space acquires a radial component.
9. A motor as in claim 7 and in which,
said thrust bearing clearance spaces are disk-shaped and on axes concentric with the axis of said rotation, and
said contiguous means includes spiral grooves in at least one of said members between the middle and periphery of said thrust bearing clearance spaces.
10. A motor as in claim 8 and in which,
said fluid is a gas which is compressed as said gas flows along said channels,
thereby to insure flow of said gas into said journal bearing clearance space.
11. An air blower comprising,
means defining a plenum chamber having air inlet and outlet openings to said chamber,
a stator member of relatively large diameter substantially fixedly mounted within said chamber on shafts of relatively small diameter concentric therewith,
said stator member having a journal bearing surface and thrust bearing surfaces at each end thereof,
means within said stator member for producing a rotating magnetic field about said stator member,
a rotor member substantially enclosing said stator member and having a journal bearing surface and thrust bearing surfaces opposing said stator member journal bearing and thrust bearing surfaces and defining contiguous journal and thrust bearing clearance spaces therebetween,
said contiguous journal bearing and thrust bearing spaces having a uniform gap,
means attached to said rotor member for intercepting said magnetic field, thereby to impart a rotation producing torque to said rotor member,
air impellers attached to said rotor member for compelling air to flow from said inlet to said outlet, and
means for conducting air from said inlet to said thrust bearing spaces, and
said air entering said bearing substantially perpendicular to the thrust bearing clearance space, whereby air flows throughout said spaces lubricating said bearings.

12. An air blower as in claim 11 and further including,
means integral with at least one of said thrust bearing surfaces which define each of said thrust bearing clearance spaces for compelling said lubricating air to flow through said thrust bearing spaces into said journal bearing space.

13. An air blower as in claim 11 and further including, channels along at least one of said thrust bearing surfaces directed oblique to the direction of motion of the opposing thrust bearing surface, whereby rotation of said rotor compels said lubricating air to flow along said channels into said journal bearing clearance space.

14. An air blower as in claim 13 and in which, said channels are spiral grooves extending between the middle and periphery of said thrust bearing surfaces.

References Cited

UNITED STATES PATENTS

| | | | |
|---|---|---|---|
| 2,772,046 | 11/1956 | Shomphe. | |
| 2,983,832 | 5/1961 | Macks | 310—90 |
| 3,110,828 | 11/1963 | Sternlicht | 310—90 |
| 3,134,037 | 5/1964 | Upton | 310—90 |

MILTON O. HIRSHFIELD, *Primary Examiner.*

L. L. SMITH, *Assistant Examiner.*